(12) United States Patent
Mosher et al.

(10) Patent No.: US 11,987,006 B2
(45) Date of Patent: May 21, 2024

(54) ADJUSTMENTS TO FORMING DATA FOR FORMING A BUILD LAYER

(71) Applicant: Hewlett-Packard Development Company, L.P., Spring, TX (US)

(72) Inventors: Daniel Mosher, Corvallis, OR (US); Jennifer Wu, Corvallis, OR (US); Vladek Kasperchik, Corvallis, OR (US); David A. Champion, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 204 days.

(21) Appl. No.: 17/417,745

(22) PCT Filed: Jul. 19, 2019

(86) PCT No.: PCT/US2019/042688
§ 371 (c)(1),
(2) Date: Jun. 23, 2021

(87) PCT Pub. No.: WO2021/015726
PCT Pub. Date: Jan. 28, 2021

(65) Prior Publication Data
US 2022/0134673 A1    May 5, 2022

(51) Int. Cl.
*B29C 64/393*    (2017.01)
*B33Y 50/02*    (2015.01)
(Continued)

(52) U.S. Cl.
CPC ............ *B29C 64/393* (2017.08); *B33Y 50/02* (2014.12); *G05B 19/4099* (2013.01); *B29C 64/153* (2017.08); *B29C 64/165* (2017.08)

(58) Field of Classification Search
CPC ........ B22D 1/005; B22D 19/06; B22D 19/16; B22D 41/56; B22D 1/00; B22F 10/28;
(Continued)

(56) References Cited

U.S. PATENT DOCUMENTS 5,460,758 A * 10/1995 Langer .................. B33Y 10/00
                                                        118/712
6,596,224 B1    7/2003   Sachs et al.
(Continued)

FOREIGN PATENT DOCUMENTS

CN         110121735 A      8/2019
WO      2015/108546 A2     7/2015
(Continued)

*Primary Examiner* — Chun Cao
(74) *Attorney, Agent, or Firm* — Michael Dryja (57) ABSTRACT

According to examples, an apparatus may include a processor and a memory on which are stored machine-readable instructions that when executed by the processor, cause the processor to determine physical characteristics of a build layer of build material particles. The instructions may also cause the processor to determine an adjustment to forming data based on the determined physical characteristics, the forming data to be used informing a subsequent build layer. The instructions may further cause the processor to apply the determined adjustment to the forming data for use in forming the subsequent build layer, in which portions of a three-dimensional (3D) object are to be formed in the build layer and the subsequent build layer.

12 Claims, 5 Drawing Sheets

(51) Int. Cl.
  *G05B 19/4099* (2006.01)
  *B29C 64/153* (2017.01)
  *B29C 64/165* (2017.01)

(58) Field of Classification Search
  CPC ........ B22F 10/85; B22F 12/90; B29C 64/153; B29C 64/165; B29C 64/393; B33Y 10/00; B33Y 30/00; B33Y 50/02; C04B 2235/6026; G05B 19/4099; Y02P 10/25
  USPC .......................................................... 700/98
  See application file for complete search history.

(56) References Cited

U.S. PATENT DOCUMENTS

| | | | |
|---|---|---|---|
| 6,813,574 B1* | 11/2004 | Yedur | H01L 23/544 |
| | | | 430/30 |
| 9,446,556 B2 | 9/2016 | Hosier et al. | |
| 9,952,236 B2 | 4/2018 | Satzger et al. | |
| 10,434,759 B2 | 10/2019 | Sands et al. | |
| 2002/0104973 A1 | 8/2002 | Kerekes | |
| 2008/0138513 A1* | 6/2008 | Perret | B22F 12/13 |
| | | | 118/640 |
| 2015/0158249 A1 | 6/2015 | Goto | |
| 2016/0158962 A1* | 6/2016 | Balistreri | B33Y 70/00 |
| | | | 428/218 |
| 2016/0214327 A1* | 7/2016 | Uckelmann | A61C 13/0019 |
| 2016/0236414 A1 | 8/2016 | Reese et al. | |
| 2016/0320771 A1* | 11/2016 | Huang | B33Y 50/00 |
| 2017/0151722 A1 | 6/2017 | Prasad et al. | |
| 2017/0203515 A1 | 7/2017 | Bennett et al. | |
| 2018/0015655 A1 | 1/2018 | Gheorghescu et al. | |
| 2018/0093419 A1* | 4/2018 | Lappas | G06F 30/20 |
| 2018/0099333 A1 | 4/2018 | Dehghanniri et al. | |
| 2018/0326712 A1* | 11/2018 | Raghavan | B33Y 50/02 |
| 2019/0022946 A1 | 1/2019 | Jones et al. | |
| 2019/0054704 A1* | 2/2019 | Goto | B33Y 50/02 |
| 2019/0232367 A1* | 8/2019 | Sheinman | B22F 3/02 |

FOREIGN PATENT DOCUMENTS

| | | |
|---|---|---|
| WO | 2018/022034 A1 | 2/2018 |
| WO | 2018/140919 A1 | 8/2018 |
| WO | WO-2019074528 A1 | 4/2019 |

* cited by examiner

ADJUSTMENTS TO FORMING DATA FOR FORMING A BUILD LAYER

BACKGROUND

In three-dimensional (3D) printing, an additive printing process may be used to make 3D solid parts from a digital model. Some 3D printing techniques are considered additive processes because they involve the application of successive layers or volumes of a build material, such as a powder or powder-like build material, to an existing surface (or previous layer). 3D printing often includes solidification of the build material, which for some materials may be accomplished through use of heat, a chemical binder, and/or a curable binder.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In 3D printing, such as in additive manufacturing technologies, thin layers of powder may be distributed in layers and joined together using an energy absorbing fusing agent, a thermally or UV curable binder, or the like, along with application of energy onto the layers. The processes to spread the powder as well as operations performed on earlier distributed layers may produce layer variability, which may cause compromised part quality, including dimensional inaccuracies and/or structural imperfections in the printed part.

Disclosed herein are apparatuses, methods, and computer readable mediums for compensating for layer variability by determining the surface topographies (e.g., contours) of the powder layers and enabling adjustments, e.g., systemic adjustments, to forming data for subsequent build layers based on the determined surface topographies. As used herein, a systemic adjustment to the forming data may be defined as an adjustment to the forming data that may be made in a print pipeline in which the adjustment is for an entire layer. In addition, the "forming data" may be defined as slice data, print pipeline data, or the like. Moreover, adjustment to the forming data may include an adjustment to a local dosing control of a print agent and/or energy within a build layer, a dynamic updating of slice artwork (e.g., geometric changes in the slice data for a build layer) based on an actual build surface height, and/or the like.

According to examples, print pipeline data may manage modifications to the local dosing of liquid, binder, and/or energy in the form of masks (e.g., arrays of numbers) that may scale contone levels locally according to layer thickness and/or density variations from nominal expectations. These examples may be construed as pertaining to an adjustment to the print pipeline. In addition, or alternatively, as control of dosing for 3D printing may reversibly be described as a superposition of a scaling mask and the binary slice data for a particular layer, the scaling mask (number array) and binary slice data may be sent separately along a print pipeline. These examples may be construed as pertaining to an adjustment to the slice data.

In some examples, a processor may access information pertaining to the build layer and may determine physical characteristics of the build layer from the accessed information. The information pertaining to the build layer may be an image of the build layer, a laser scan of the build layer, and/or the like. In a particular example, an image, e.g., a stereoscopic image, a laser scan, and/or the like, may be taken of a subset of the build layer, a pattern may be determined from the image, scan, and/or the like, of the section, and the pattern may be extrapolated to the entire build layer. The extrapolated pattern may be used to determine adjustments to the forming data, e.g., in the print pipeline, to compensate for the variability in the build layer identified by the extrapolated pattern. The adjustments may include adjustments to first volumes of an agent or multiple agents identified in the forming data to be applied onto various locations on a subsequent build layer to compensate for variations in the build layer. The first volumes may be the volumes that were previously, e.g., originally, determined to be used to form sections of a 3D object in the subsequent build layer during processing of the model of the 3D object in a print pipeline.

Through implementation of the present disclosure, the volumes of an agent or agents that are to be used across the entire subsequent build layer and not just at certain locations on the subsequent build layer may be adjusted. As a result, a 3D object may be fabricated with a high level of quality, e.g., precise dimensions, mechanical strength, color, texture, and/or the like.

Figure 1:
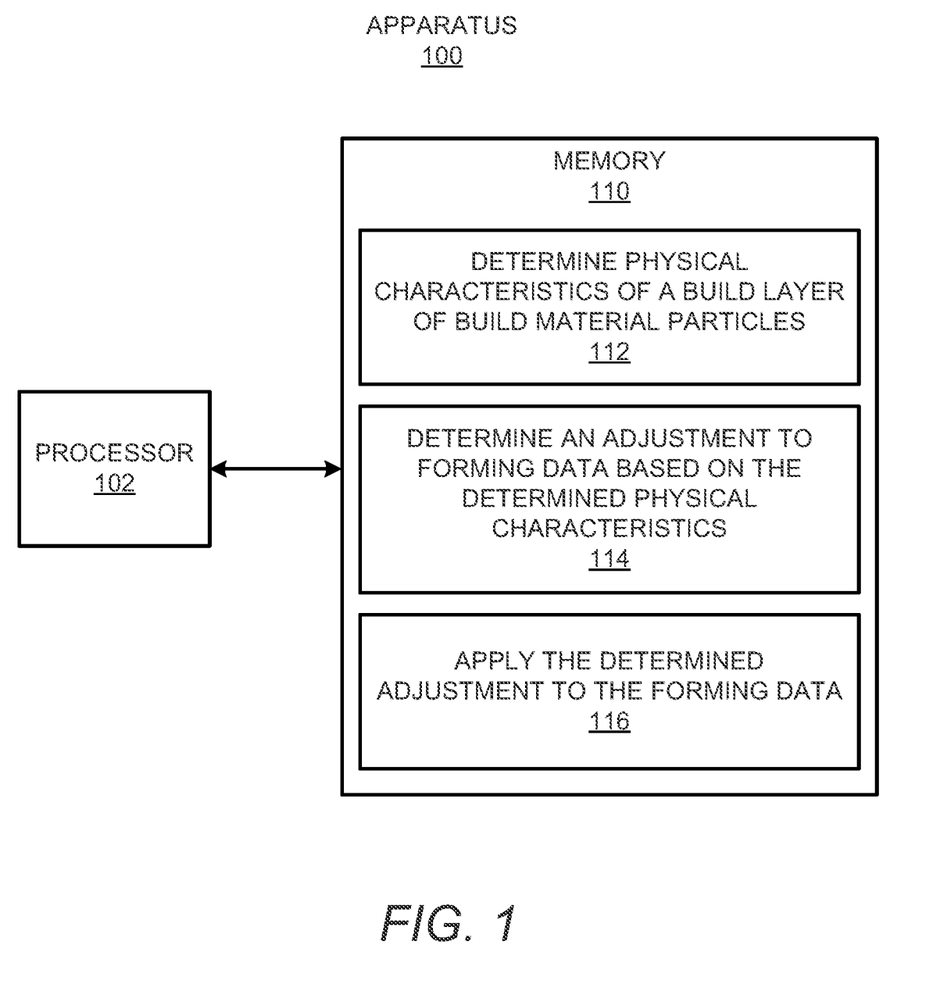
FIG. 1 shows a block diagram of an example apparatus that may provide for an adjustment to forming data for use in forming a subsequent build layer.
Figure 2:
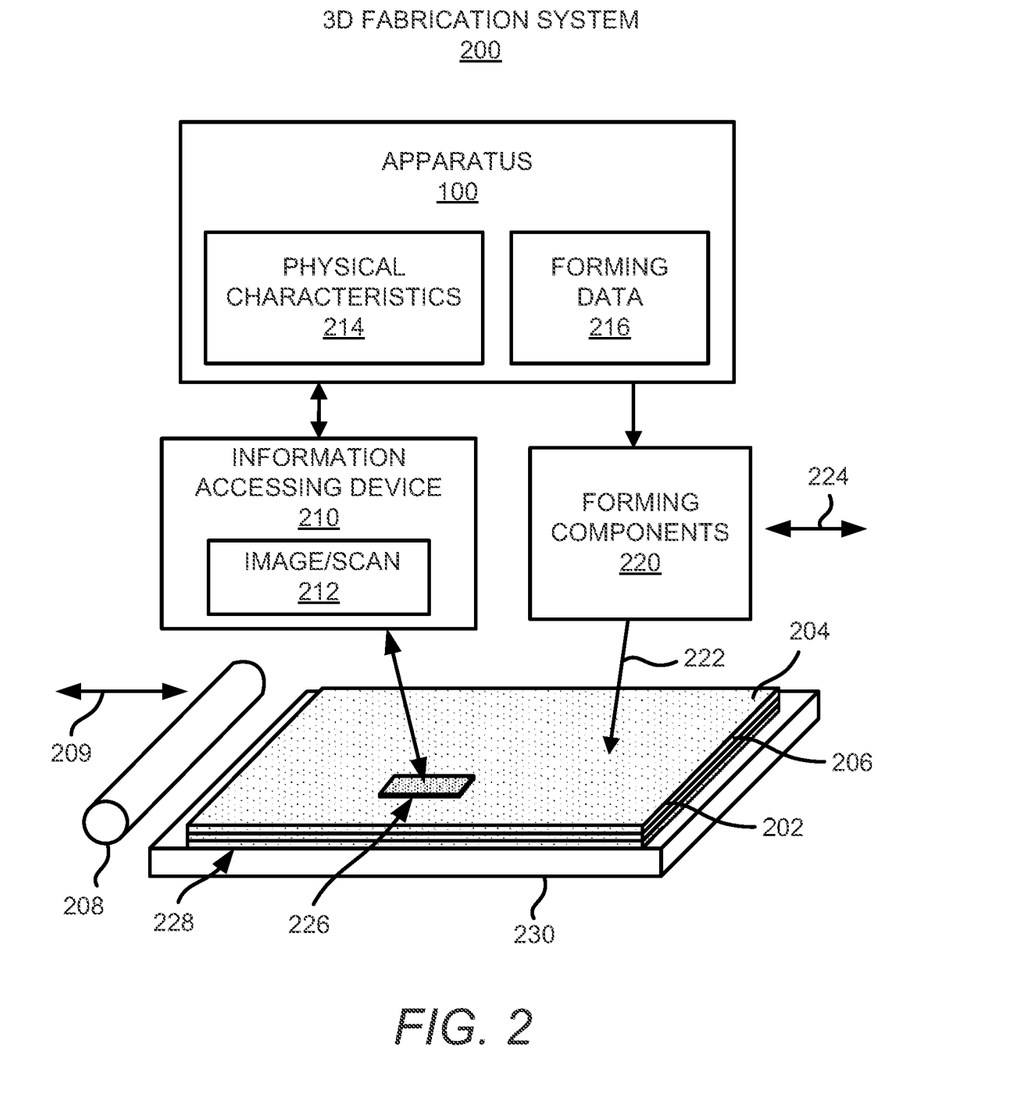
FIG. 2 shows a diagram of an example 3D fabrication system in which the apparatus depicted in FIG. 1 may be implemented.

Reference is first made to FIGS. 1 and 2. FIG. 1 shows a block diagram of an example apparatus 100 that may provide for an adjustment to forming data for use in forming a subsequent build layer. FIG. 2 shows a diagram of an example 3D fabrication system 200 in which the apparatus 100 depicted in FIG. 1 may be implemented. It should be understood that the example apparatus 100 depicted in FIG. 1 and/or the example 3D fabrication system 200 depicted in FIG. 2 may include additional features and that some of the features described herein may be removed and/or modified without departing from the scopes of the apparatus 100 and/or the 3D fabrication system 200.

The apparatus 100 may be a computing device, a tablet computer, a server computer, a smartphone, or the like. The apparatus 100 may also be part of a 3D fabrication system 200, e.g., a control system of the 3D fabrication system 200. Although a single processor 102 is depicted, it should be understood that the apparatus 100 may include multiple processors, multiple cores, or the like, without departing from a scope of the apparatus 100.

The 3D fabrication system 200, which may also be termed a 3D printing system, a 3D fabricator, or the like, may be implemented to fabricate 3D objects through selectively solidifying of build material particles 202, which may also be termed particles 202 of build material, together. In some examples, the 3D fabrication system 200 may use energy, e.g., in the form of light and/or heat, to selectively fuse the particles 202. In addition or in other examples, the 3D fabrication system 200 may use fusing and/or binding agents to selectively bind or solidify the particles 202. In particular examples, the 3D fabrication system 200 may use fusing agents that increase the absorption of energy to selectively fuse the particles 202.

According to one example, a suitable fusing agent may be an ink-type formulation including carbon black, such as, for example, the fusing agent formulation commercially known as V1Q60A "HP fusing agent" available from HP Inc. In one example, such a fusing agent may additionally include an infra-red light absorber. In one example such fusing agent may additionally include a near infra-red light absorber. In one example, such a fusing agent may additionally include a visible light absorber. In one example, such a fusing agent may additionally include a UV light absorber. Examples of fusing agents including visible light enhancers are dye based colored ink and pigment based colored ink, such as inks commercially known as CE039A and CE042A available from HP Inc. According to one example, the 3D fabrication system 200 may additionally use a detailing agent. According to one example, a suitable detailing agent may be a formulation commercially known as V1Q61A "HP detailing agent" available from HP Inc.

The build material particles 202 may include any suitable material for use in forming 3D objects. The build material particles 202 may include, for instance, a polymer, a plastic, a ceramic, a nylon, a metal, combinations thereof, or the like, and may be in the form of a powder or a powder-like material. Additionally, the build material particles 202 may be formed to have dimensions, e.g., widths, diameters, or the like, that are generally between about 5 µm and about 100 µm. In other examples, the particles may have dimensions that are generally between about 30 µm and about 60 µm. The particles may have any of multiple shapes, for instance, as a result of larger particles being ground into smaller particles. In some examples, the particles may be formed from, or may include, short fibers that may, for example, have been cut into short lengths from long strands or threads of material. In addition or in other examples, the particles may be partially transparent or opaque. According to one example, a suitable build material may be PA12 build material commercially known as V1R10A "HP PA12" available from HP Inc.

As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. The apparatus 100 may also include a memory 110 that may have stored thereon machine-readable instructions 112-116 (which may also be termed computer readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

The 3D fabrication system 200 may include a spreader 208 (e.g., a roller) that may spread the build material particles 202 into a layer 206 (also referred to herein as a "build layer"), e.g., through movement across a platform 230 as indicated by the arrow 209. In some instances, application of the build material particles 202 by the spreader 208 may cause topographical variations in the surface 204 of the layer 206. The topographical variations may be caused by, for instance, variations in the heights across a previously formed layer 206 due to formation of portions of a 3D object in the previously formed layer 206, variations caused during spreading of the build material particles 202 in the current layer 206, and/or the like.

As shown in FIG. 2, the 3D fabrication system 200 may include an information accessing device 210 to capture an image/scan 212 from which the topographical variations may be detected. The image/scan 212 of the build layer 206 may be referenced as a 3D surface map, a stereoscopic 3D image, a laser scan, and/or the like and may display height (z-direction) information of the build material particles 202 in the build layer 206. The information accessing device 210 may be a camera system that includes a single camera or multiple cameras positioned at different angles with respect to each other such that multiple ones of the captured images may be combined to generate a surface map. According to examples, the information accessing device 210 may capture high-resolution images, e.g., high definition quality, 4K resolution quality, or the like, such that the stereoscopic 3D images generated from images 212 captured by the information accessing device 210 may also be of high resolution. In addition, the 3D fabrication system 200 may include a light source (not shown) to illuminate the layer surface 204 and enable the information accessing device 210 to capture fine details in the layer surface 204. In other examples, the information accessing device 210 may be a laser scanner that may scan across the build layer 206 or a portion of the build layer 206 to measure heights.

The processor 102 may control the information accessing device 210 to capture the image/scan 212 of the layer surface 204. In addition, the information accessing device 210 may generate the image/scan 212 and may communicate the generated image/scan 212 to the processor 102 and/or to a data store (not shown) from which the processor 102 may access the image/scan 212 of the build layer 206 or a portion of the build layer 206. In some examples, the processor 102 may access the image/scan 212, either directly from the information accessing device 210 or from the data store.

As also shown in FIG. 2, the 3D fabrication system 200 may include forming components 220 that may output energy/agent 222 onto the layer 206 as the forming components 220 are scanned across the layer 206 as denoted by the arrow 224. The forming components 220 may also be scanned in the direction perpendicular to the arrow 224 or in other directions. In addition, or alternatively, a platform 230 on which the layers 206 are deposited may be scanned in directions with respect to the forming components 220.

The fabrication system 200 may include a build zone 228 (e.g., powder bed) within which the forming components 220 may solidify the build material particles 202 in the layer 206. A selected area 226 of the build layer 206 may correspond to a section of the build layer 206 that the information accessing device 210 may access. The selected area 226 may include a portion of a 3D object being fabricated in multiple layers 206 of the build material particles 202. The forming components 220 may include, for instance, an energy source, e.g., a laser beam source, a heating lamp, or the like, that may apply energy onto the layer 206 and/or that may apply energy onto the selected area 226.

In addition or alternatively, the forming components 220 may include a fusing agent delivery device to selectively deliver a fusing agent onto the build material particles 202 on the layer 206, in which the fusing agent enhances absorption of the energy to cause the build material particles 202 upon which the fusing agent has been deposited to melt. The fusing agent may be applied to the build material particles 202 prior to application of energy onto the build material particles 202. In other examples, the forming components 220 may include a binding agent delivery device that may deposit a binding agent, such as an adhesive that may bind build material particles 202 upon which the binding agent is deposited. The binding agent may be a curable binding agent in some examples.

The solidified build material particles 202 may equivalently be termed fused build material particles, bound build material particles, or the like. In any regard, the solidified build material particles 202 may be a part of a 3D object, and the 3D object may be built through selective solidifying of the build material particles 202 in multiple layers 206 of the build material particles 202.

In some examples, the image/scan 212 of a selected area 226 may have been generated prior to a solidifying operation being performed on the layer 206 of build material particles 202. In other examples, the information accessing device 210 may generate the image/scan 212 after fusing agent and energy have been applied on a layer 206 of build material particles 202. In still other examples, the information accessing device 210 may continuously generate images 212, e.g., video, and the continuously generated images 212 may be used to continuously create multiple stereoscopic 3D images, e.g., video.

With reference to FIGS. 1 and 2, the processor 102 may fetch, decode, and execute the machine-readable instructions 112 to determine physical characteristics 214 of a build layer 206 of build material particles 202. As discussed herein, the processor 102 may determine the physical characteristics 214 of the build layer 206 from an image/scan 212 of the build layer 206 or a portion of the build layer 206. The physical characteristics 214 of the build layer 206 may be thicknesses across the selected area 226 of the build layer 206, densities across the selected area 226 of the build layer 206, a surface topography (e.g., contours) of the layer surface 204 at the selected area 226, and/or the like. The processor 102 may determine the physical characteristics 214 of the selected area 226 by determining the heights of multiple locations on the selected area 226 from the image/scan 212. In addition, the processor 102 may determine the physical characteristics 214 of the selected area 226 by comparing the heights of the multiple locations on the selected area 226 with the heights of multiple locations on a selected area 226 of a previously formed layer 206.

The physical characteristics 214 of the build layer 206 may alternatively be thicknesses across the build layer 206, densities across the build layer 206, a surface topography (e.g., contours) of the layer surface 204, and/or the like. In instances in which the image/scan 212 is of the entire build layer surface 204, the processor 102 may determine the physical characteristics 214 of the build layer 206 directly from the image/scan 212. However, in instances in which the image/scan 212 is of the selected area 226, the processor 102 may determine the physical characteristics 214 of the selected area 226 and may extrapolate the physical characteristics 214 determined for the selected area 226 to the remaining areas of the layer 206. By way of example, the processor 102 may extend out the physical characteristics 214 determined for the selected area 226 onto the remaining areas of the layer 206.

In some examples, the processor 102 may identify a pattern in the physical characteristics 214, e.g., contours, of the selected area 226 and may extrapolate the identified pattern to the remaining areas of the layer 206. In addition, the processor 102 may identify a pattern in variations in thicknesses in different locations of the build layer 206, and may match the pattern to a function (e.g., a sinusoidal function, or the like) to extrapolate the pattern to other regions of the build layer 206. The pattern, which may correspond to the image/scan 212, may be aligned to match the physical build layer 206 based on, for example, 3D feature correlation and coordinate system mapping.

In some examples, the processor 102 may measure the thicknesses across locations of the build layer 206 using various optical measurement techniques, and the densities across locations of the build layer 206 may be determined based on the variations in thicknesses of the build layer 206. In some examples, the processor 102 may measure surface height variations using stereoscopic disparity between multiple images taken from different vantage points. The processor 102 may determine layer thicknesses based on comparisons of surface heights for a corresponding location on multiple build layers 206. In other examples, the processor 102 may reconstruct a 3D surface topography of the layer surface 204 using optical geometry (triangulation) and measured disparity. It should be appreciated that while the physical characteristics 214 are described as being in a single dimension, the present disclosure is not so limited and variation in the physical characteristics 214 may be determined in multiple dimensions (e.g., in multiple spread directions) and based on a plurality of aspects of the 3D printing process.

The processor 102 may fetch, decode, and execute the machine-readable instructions 114 to determine an adjustment to forming data 216 for use in forming a subsequent build layer 206 based on the determined physical characteristics 214 of the build layer 206. The forming data 216 may include data that identifies volumes and locations at which droplets of a fusing agent (or equivalently, a binding agent) are to be deposited on each of the build layers 206 to form portions of a 3D object or multiple 3D objects in the build layers 206. The forming data 216 may also include data that identifies amounts of energy to be applied to each or portions of each of the build layers 206 to form the portions of the 3D object or objects. As discussed herein, the forming data 216 may be slice data and/or print pipeline data.

According to examples, the forming data 216 may have been generated in a print pipeline from, for instance, a data file corresponding to a 3D object or objects to be fabricated. That is, a determination may have been made in the print pipeline, based on the features of the 3D object or objects described in the data file, each of the slices, e.g., layers 206, that are to be formed to fabricate the 3D object or objects. In addition, for each of the slices, a determination may have been made in the print pipeline of the volumes and locations at which droplets of a fusing agent, a colorant, a detailing agent, and/or the like, that are to be deposited to fabricate the portions of the 3D object or objects in the slice. A determination may also have been made in the print pipeline of the levels at which energy is to be applied onto each of the layers or sections of the layers to fabricate the portions of the 3D object or objects in the slice. In any regard, the forming data 216 may have been forwarded from or as part of the print pipeline to the apparatus 100 such that the apparatus 100 may use the forming data 216 in controlling the 3D fabrication system 200 to fabricate the 3D object or objects.

In some examples, the processor 102 may determine variations in the build layer 206 from the determined physical characteristics 214 of the build layer 206. The processor 102 may identify locations in the build layer 206 that may be abnormal, e.g., extend to a height that is greater than a predetermined difference in height with respect to surrounding locations, extend to a height that is lower than a predetermined difference in height with respect to surrounding locations, and/or the like. The predetermined differences may be user-defined and/or determined through testing, historical data, etc. By way of particular example, the predetermined differences may correspond to difference levels that may have been determined to result in defects or other issues related to fabrication of 3D objects in the build layers 206.

In some instances, the variations in the physical characteristics in a current layer 206 may cause a subsequent layer 206 or subsequent layers 206 that may be formed on top of the current build layer 206 to include variations in similar locations as the variations in the current layer 206. According to examples, the processor 102 may determine an adjustment to the forming data 216 for the subsequent layer 206 or layers 206 to accommodate and/or compensate for the determined variations in the physical characteristics. For instance, the processor 102 may determine an adjustment to the forming data 216 corresponding to the formation of a portion of a 3D object or objects in a subsequent layer 206 that may compensate for the variations across the subsequent layer 206. By way of example, the processor 102 may determine an adjustment to the forming data 216 that may be intended to result in a reduction or an elimination of the variations in the subsequent layer 206. The adjustment may include an adjustment to the volume of fusing agent or other agent to be applied to various locations during formation of the portion of the 3D object in the subsequent layer 206. In addition, or alternatively, the adjustment may include an adjustment to an amount of build material particles 202 to be deposited at various locations of the subsequent layer 206. In addition, or alternatively, the adjustment may include an adjustment to an amount of energy to be applied at various locations of the subsequent layer 206.

According to examples, the adjustment to the forming data 216 may be determined from historical data, testing, or the like. That is, the amount of fusing agent volume change, or the like, to be made in the forming data 216 may be determined from the results of such changes made during prior 3D object fabrication operations. In some examples, the adjustment to the forming data 216 may include an adjustment to change or modify a geometry of a portion of the 3D object being formed in the subsequent layer 206 to compensate for the variations in the physical characteristic 214 of the build layer 206. A level of adjustment for the fusing agent and/or energy 222 to be applied may be based on correlations between the determined physical characteristics 214 and adjustments for the fusing agent and/or energy to be applied in the subsequent build layer 206 to compensate for the determined physical characteristics 214. The processor 102 may compensate for the determined physical characteristics 214 to correct or reduce imperfections, abnormalities, or the like in the subsequent build layer 206 that may be caused through adherence to the volume and/or energy levels defined in the initial forming data 216.

As discussed herein, the forming data 216 that the processor 102 may use to fabricate the 3D object may be adjusted instead of the processor 102 merely adjusting features corresponding to the fabrication of a certain portion of the 3D object in a layer. In addition, the processor 102 may make a systemic adjustment to the forming data 216 for a subsequent layer 206, e.g., a layer-wide adjustment. As a result, the processor 102 may accommodate for and/or compensate for variations in the build layers 206 as a whole, which may result in the 3D object being formed with higher quality than may be attained with the adjusting features corresponding to the fabrication of a certain portion of the 3D object in a layer.

The processor 102 may fetch, decode, and execute the machine-readable instructions 116 to apply the determined adjustment to the forming data 216 for use in forming the subsequent build layer 206. The processor 102 may apply the determined adjustment by adjusting the information included in the forming data 216 corresponding to the formation of the subsequent layer 206 or subsequent layers 206. In addition, the processor 102 may use the adjusted forming data 216 to form a subsequent layer 206 or multiple subsequent layers 206.

Reference is now made to FIGS. 3A-3D, which, collectively, show an example process 300 in which compensation for variations in a contour 302 of a build layer 206 may be made. It should be understood that the example process 300 depicted in FIGS. 3A-3D may include additional features and that some of the features described herein may be removed and/or modified without departing from the scope of the process 300.

Figure 3A:
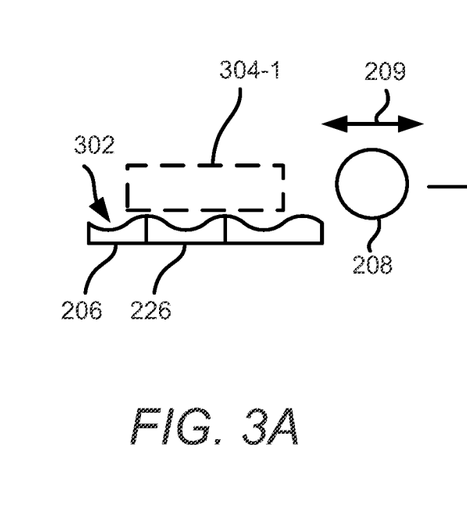
FIGS. 3A-3D, collectively, show an example process to compensate for variations in a contour of a build layer.

As illustrated in FIG. 3A, topographical variations 302 on the layer surface 204 of the build layer 206 may be formed, for instance, by the spreader 208. For example, as the spreader 208 is moved in either of the directions 209 to spread the build material particles 202, topographical variations 302 may be caused by various factors such as a non-level roller, presence of printed parts in a previous build layer 206, or the like. These topographical variations 302 may drive local energy/agent 222 requirements and may affect dimensional accuracy and/or strength of a 3D object formed from the build layer 206. As disclosed herein, the processor 102 may determine the topological variations 302 from an image/scan 212 of the build layer 206. In addition, the processor 102 may use the determined topological variations 302 to determine and apply adjustments, e.g., systemic adjustments, to forming data 216 to compensate for the topographical variations 302 in a subsequent layer 206.

In some examples, the processor 102 may control the information accessing device 210 to generate an image/scan 212 of the selected area 226 of the build layer 206. The image/scan 212 of the selected area 226 may include all of the build layer 206 in the build zone 228 or a partial area of the build layer 206. The processor 102 may access the image/scan 212 and may determine the physical characteristics 214 of the build layer 206 from the image/scan 212 in any of the manners as discussed herein.

In some examples, the processor 102 may detect a pattern in the variations in thicknesses in different locations of the build layer 206, and may match the pattern to a function (e.g., a sinusoidal function, or the like) to extrapolate the pattern to other regions. The extrapolated pattern, which may correspond to the image/scan 212, may be aligned to match the physical build layer 206 based on, for example, 3D feature correlation and coordinate system mapping.

Figure 3B:
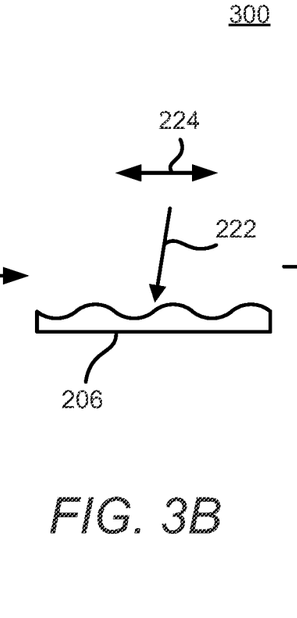

The processor 102 may adjust the forming data 216 to be used to control the forming components 220 as discussed herein. As shown in FIG. 3B, the processor 102 may control the forming components 220 to output energy/agent 222 based on the adjusted values in the forming data 216. The adjustments to the forming data 216 may include adjustments that may drive local energy/agent 222 values to avoid agent flooding, insufficient penetration of energy/agent, or the like, as a function of position on the build layer 206. In order to meet the local energy/agent 222 requirements, the processor 102 may determine an adjustment to the forming data 216 across all regions of the build layer 206 based on the detected variations in the selected area 226 of the build layer 206. The processor 102 may apply the determined adjustment to the forming data 216 and may use the adjusted forming data 216 to control the forming components 220 to output the adjusted energy/agent 222 onto the build layer 206 to form a portion 304-1 of the 3D object in a subsequent layer 206. In some examples, the processor 102 may adjust a volume and/or location of an agent to be deposited or a level of energy to be applied at a voxel level across the build layer 206 throughout subsequent build layers 206.

Figure 3C:
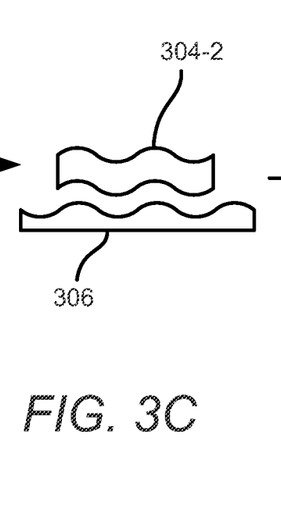
Figure 3D:
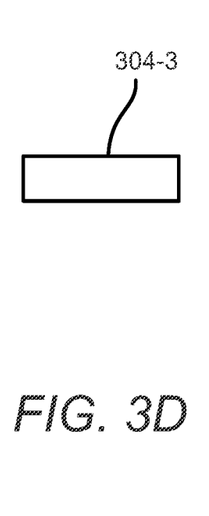

Referring to FIGS. 3A, 3C, and 3D, in some examples, the processor 102 may adjust the forming data 216 to adjust a geometry of the 3D object 304-2 identified in the forming data 216 based on the determined variations in the physical characteristic 214 of the build layer 206. In some instances, the variations in contour 302 of the build layer 206 may cause defects in the geometry of a 3D object. For example, without modifications to the forming data 216, a 3D object may be formed having deformities caused by the contour 302 (similar to a shape of the portion 304-2 as depicted in FIG. 3C). In some examples, the forming data 216 may be adjusted to change the geometry of the portion 304-2 to compensate for the variations in the contour 302 of the build layer 206 to enable formation of a portion 304-3 of the 3D object that more closely reflects the geometry of the original design for the portion 304-3 as shown in FIG. 3D. The geometric compensation of the portion 304-2 may be implemented in addition to the adjustment in applying the energy/agent 222 as previously described with reference to FIG. 3B, or alternatively, these operations may be implemented separately.

Figure 4:
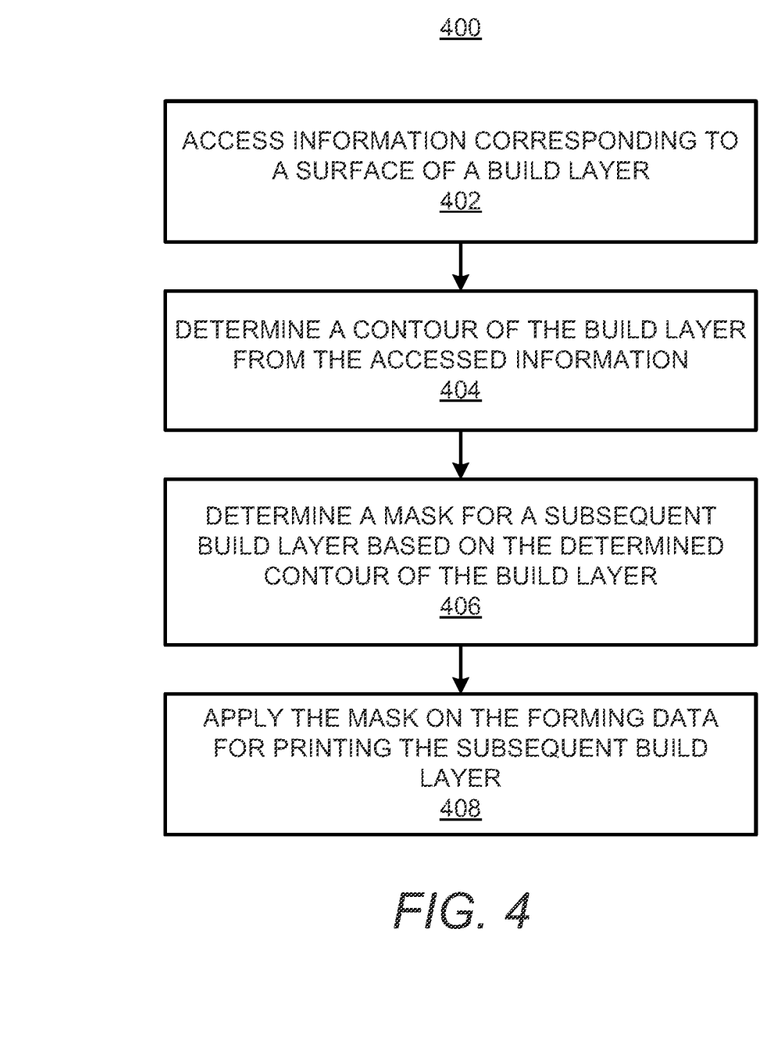
FIGS. 4 and 5, respectively, show flow diagrams of example methods for determining a mask for a subsequent build layer that may compensate for variations in the contour of a build layer.
Figure 5:
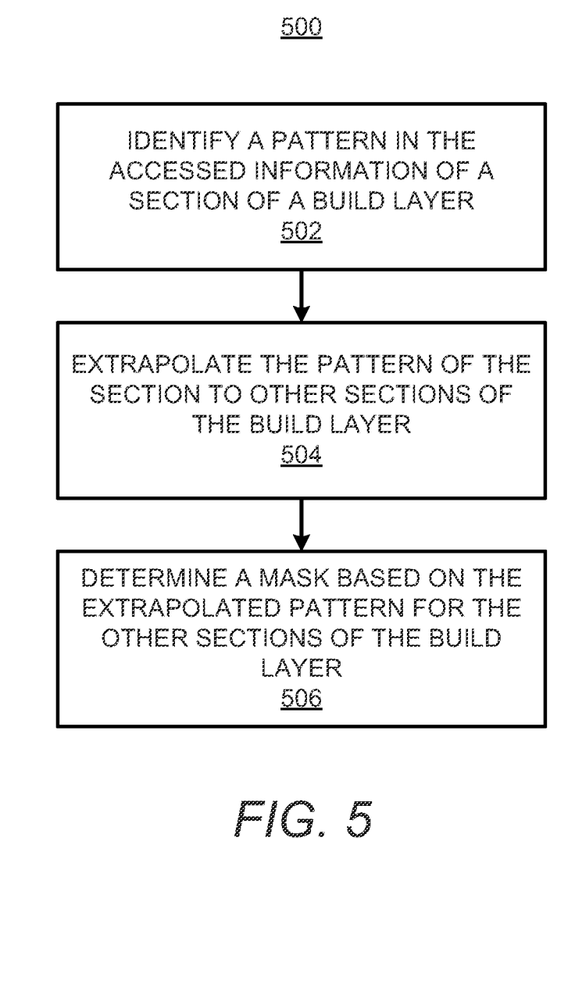

Turning now to FIGS. 4 and 5, there are respectively shown flow diagrams of example methods 400 and 500 for determining a mask that may compensate for variations in a contour 302 of a subsequent build layer 206. It should be understood that the methods 400 and 500 depicted in FIGS. 4 and 5 may include additional operations and that some of the operations described therein may be removed and/or modified without departing from the scopes of the methods 400 and 500. The descriptions of the methods 400 and 500 are also made with reference to the features depicted in FIGS. 1-3D for purposes of illustration. Particularly, the processor 102 of the apparatus 100 may execute some or all of the operations included in the methods 400 and 500.

With reference first to FIG. 4, at block 402, the processor 102 may access information, e.g., image/scan 212, corresponding to a surface of a build layer 206 formed of build material particles 202. The processor 102 may access the image/scan 212 from an information accessing device 210 or from a data store. In addition, the information accessing device 210 may generate the image/scan 212. In some examples, the information accessing device 210 may be a camera system having a single camera or multiple cameras, or another appropriate imaging device that may capture, for example, 3D topographical information. In other examples, the information accessing device 210 may be a laser scanning system.

At block 404, the processor 102 may determine a contour 302 of the build layer 206 from the accessed information, e.g., generated image/scan 212, in any of the manners discussed herein. At block 406, the processor 102 may determine a mask for a subsequent build layer 206 based on the determined contour 302 of the build layer 206. In some examples, the mask may indicate an amount of adjustment to be applied in printing data for the subsequent build layer 206 of a digital 3D model to compensate for the determined contour of the build layer 206. In some examples, the map may spatially correspond to the image/scan 212, and may be aligned based on a location of the selected area 226 and/or a physical portion 304-1 of a 3D object on the build layer 206.

In some examples, the processor 102 may determine thicknesses or densities of locations in a selected area 226. The selected area 226 may be a partial region of the build layer 206 or may include all regions of the build layer 206. As previously described, in instances in which the selected area 226 is a partial section of the build layer 206, the thicknesses or densities determined for the selected area 226 may be extrapolated for all other regions of the build layer 206. The processor 102 may determine the contour 302 of the build layer 206 from the determined thicknesses or densities based on the physical characteristics 214 of the selected area 226, either directly from an image/scan 212 generated for all of the regions of the build layer 206 or based on extrapolated thicknesses and densities from an image/scan 212 of a partial region of the build layer 206.

At block 408, the processor 102 may apply the mask on the forming data 216 for printing a subsequent build layer 206. In some examples, the processor 102 may determine levels of adjustment to be applied to agent and/or energy levels identified in the forming data 216 for locations across the subsequent build layer 206 to compensate for the determined contour 302 of the build layer 206, and may determine the mask based on the determined levels of adjustment.

In some examples, the processor 102 may determine the contour 302 of the build layer 206 based on an image/scan 212 of a partial area of the build layer 206. Particularly, and as discussed with respect to the method 500 depicted in FIG. 5, the processor 102 may extrapolate a pattern from a partial area, e.g., area 226, to most or all of the build layer 206.

At block 502, the processor 102 may identify a pattern in the accessed information, e.g., image/scan 212, of the area 226, e.g., section, of the build layer 206. In some instances, the area 226 corresponding to the image/scan 212 may be a partial region of the build layer 206 and the identified pattern may be determined based on an image/scan 212 from the partial region of the build layer 206. At block 504, the processor 102 may determine the contour 302 by extrapolating the pattern of the area 226 of the build layer 206 to other sections of the build layer 206. At block 506, the processor 102 may determine the mask for the subsequent build layer 206 based on the extrapolated pattern for the other sections of the build layer 206.

Some or all of the operations set forth in the methods 400 and 500 may be contained as utilities, programs, or subprograms, in any desired computer accessible medium. In addition, the methods 400 and 500 may be embodied by computer programs, which may exist in a variety of forms. For example, the methods 400 and 500 may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 6:
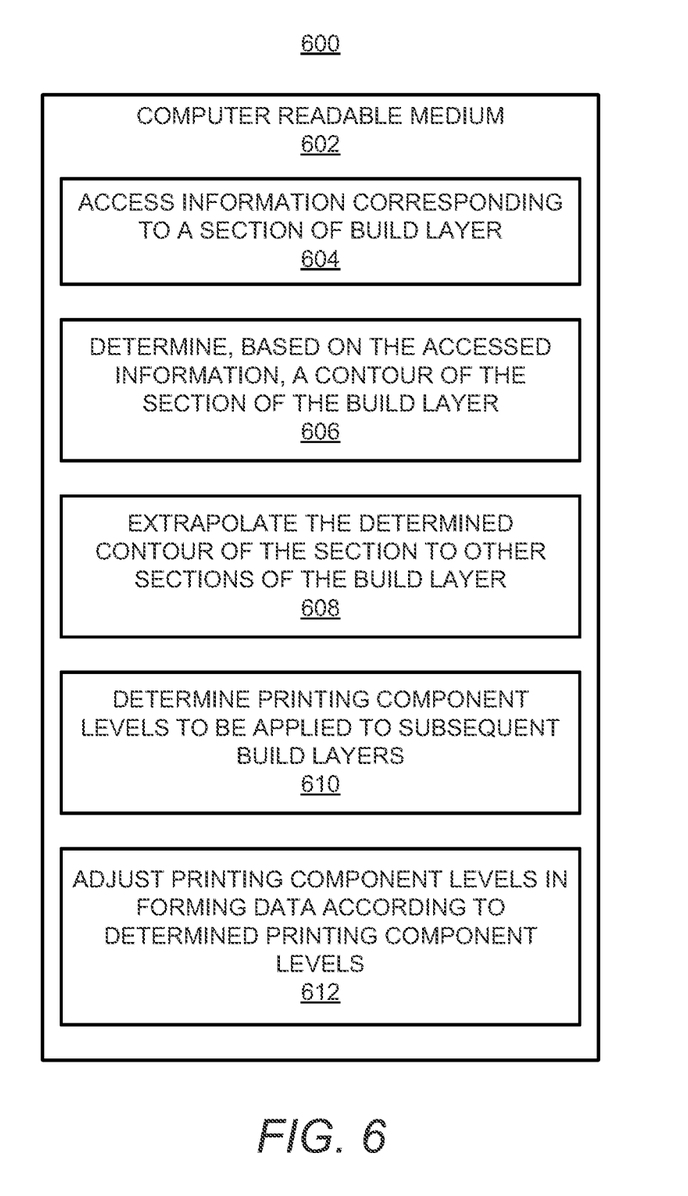
FIG. 6 shows a block diagram of an example non-transitory computer readable medium on which is stored machine-readable instructions for determining adjustments to forming data for a 3D object.

Turning now to FIG. 6, there is shown a block diagram 600 of an example non-transitory computer readable medium 602 on which is stored machine-readable instructions 604-612 for determining adjustments to forming data 216 for a 3D object. A processor 102 may execute the machine-readable instructions 604-612. Particularly, the processor 102 may execute the instructions 604 to access information, e.g., image/scan 212, corresponding to a section 226 of a build layer 206. The processor 102 may execute the instructions 606 to determine, based on the accessed information, a contour 302 of the area 226 of the build layer 206. The processor 102 may execute the instructions 608 to extrapolate the determined contour 302 of the area 226 to other sections of the build layer 206 to determine a contour 302 for most or all of the build layer 206. The processor 102 may execute the instructions 610 to determine forming component levels (e.g., energy/agent 222 in FIG. 3B) to be applied during formation of a portion of a 3D object (e.g., 3D object 304-2) in a subsequent build layer 206 to compensate for the determined contour 302 of the build layer 206. The processor 102 may execute the instructions 612 to adjust forming component levels in forming data 216 for the 3D object (e.g., 3D object 304-2) according to the determined forming component levels.

Although not shown, the non-transitory computer readable medium 602 may also include instructions that may cause the processor 102 to determine thicknesses or densities of the area 226 of the build layer 206 from the accessed information, e.g., image/scan 212 of the area 226 of the build layer 206, and to determine the contour 302 of the area 226 of the build layer 206 from the determined thicknesses or densities of the area 226 of the build layer 206. In addition, the instructions may cause the processor 102 to determine a level of adjustment for an agent and/or energy (e.g., energy/agent 222 in FIG. 3B) to be applied based on correlations between determined contour 302 of the build layer 206 and adjustments for the agent and/or energy to be applied in the subsequent build layer 206 to compensate for the determined contour 302 in order to determine the fusing component levels to be applied during formation of the portion of the 3D object (e.g., 3D object 304-2 in FIG. 3C) in the subsequent build layer 206.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which are stored machine-readable instructions that when executed by the processor, cause the processor to:
cause formation of a build layer of a three-dimensional (3D) object, including:
depositing and spreading a layer of build material particles; and
selectively applying print agent on the layer in order to realize the build layer of the 3D object;
determine physical characteristics of the formed build layer at a plurality of locations of the build layer;
determine, based on the physical characteristics determined at the locations of the build layer, dosing adjustments to the print agent be used when forming a subsequent build layer of the 3D object, the dosing adjustments being other than systemic adjustments for the subsequent build layer as a whole, the dosing adjustments being local adjustments for certain locations of the subsequent build layer; and
cause formation of the subsequent layer of the 3D object, including:
depositing and spreading a subsequent layer of build material particles; and
selectively applying the print agent on the subsequent layer in accordance with the dosing adjustments to the print agent to realize the subsequent build layer of the 3D object.

2. The apparatus of claim 1, wherein the instructions are further to cause the processor to:
access information corresponding to a surface of the build layer; and
determine thicknesses and/or densities the locations of the build layer from the accessed information of the build layer,
wherein the instructions cause the processor to determine the physical characteristics of the build layer from the determined thicknesses and/or densities.

3. The apparatus of claim 2, wherein the instructions are further to cause the processor to:
determine a contour of the build layer based on the determined thicknesses and/or densities of locations across the build material,
wherein the instructions cause to the processor to determine the dosing adjustments based on the determined contour.

4. The apparatus of claim 1, wherein the instructions are further to cause the processor to:
access information corresponding to a portion of the build layer;
determine a pattern in the portion of the build layer from the accessed information; and
extrapolate the pattern to the build layer outside of the portion of the build layer, wherein the instructions cause the processor to determine the dosing adjustments based on the extrapolated pattern.

5. The apparatus of claim 1, wherein the instructions are further to cause the processor to:
receive an image of the build layer captured by a stereoscopic imaging device,
wherein the instructions cause the processor to determine the physical characteristics of the build layer from the received image.

6. The apparatus of claim 1, wherein the print agent comprises fusing agent.

7. The apparatus of claim 1, wherein the print agent comprising detailing agent.

8. A method comprising:
causing, by a processor, formation of a build layer of a three-dimensional (3D) object, including:
depositing and spreading a layer of build material particles; and
selectively applying print agent on the layer in order to realize the build layer of the 3D object;
accessing, by the processor, information corresponding to a surface of the build layer that has been formed;
determining, by the processor, a contour of the build layer from the accessed information;
determining, by the processor, a mask based on the determined contour, the mask incorporating dosing adjustments to the print agent be used when forming a subsequent build layer of the 3D object, the dosing adjustments being other than systemic adjustments for the subsequent build layer as a whole, the dosing adjustments being local adjustments for certain locations of the subsequent build layer; and
causing, by the processor, formation of the subsequent layer of the 3D object, including:
depositing and spreading a subsequent layer of build material particles; and
selectively applying the print agent on the subsequent layer in accordance with the dosing adjustments to the print agent to realize the subsequent build layer of the 3D object.

9. The method of claim 8, wherein accessing the information corresponding to the surface of the build layer comprises accessing information corresponding to a section of the surface,
and wherein determining the contour of the build layer comprises identifying a pattern in the accessed information of the section of the surface and determining the contour by:
extrapolating the pattern of the section of the surface to other sections of the surface; and
determining the mask for the subsequent build layer based on the identified pattern of the section and the extrapolated pattern for the other sections of the build layer.

10. The method of claim 8, further comprising:
determining thicknesses or densities at a plurality of locations of the build layer from the accessed information; and
determining the contour of the build layer from the thicknesses or densities determined at the locations of the build layer.

11. A non-transitory computer readable medium storing machine-readable instructions that when executed by a processor, cause the processor to:
cause formation of a build layer of a three-dimensional (3D) object, including:
depositing and spreading a layer of build material particles; and
selectively applying print agent on the layer in order to realize the build layer of the 3D object;
access information corresponding to a section of the build layer that has been formed;
determine, based on the accessed information, a contour of the section of the build layer;
extrapolate the determined contour of the section to other sections of the build layer to determine a contour of the build layer;
determine dosing adjustments to the print agent be used when forming a subsequent build layer of the 3D object, the dosing adjustments being other than systemic adjustments for the subsequent build layer as a whole, the dosing adjustments being local adjustments for certain locations of the subsequent build layer; and
cause formation of the subsequent layer of the 3D object, including:
depositing and spreading a subsequent layer of build material particles; and
selectively applying the print agent on the subsequent layer in accordance with the dosing adjustments to the print agent to realize the subsequent build layer of the 3D object.

12. The non-transitory computer readable medium of claim 11, wherein the instructions are further to cause the processor to:
determine thicknesses or densities of the section of the build layer from the accessed information corresponding to the section of the build layer,
wherein the instructions cause the processor to determine the contour from the determined thicknesses or densities.

* * * * *